United States Patent
Ogita et al.

(10) Patent No.: US 12,101,576 B2
(45) Date of Patent: Sep. 24, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Takeshi Ogita, Kanagawa (JP); Ikuo Yamano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 211 days.

(21) Appl. No.: 17/621,455

(22) PCT Filed: May 18, 2020

(86) PCT No.: PCT/JP2020/019600
§ 371 (c)(1),
(2) Date: Dec. 21, 2021

(87) PCT Pub. No.: WO2020/261805
PCT Pub. Date: Dec. 30, 2020

(65) Prior Publication Data
US 2022/0353457 A1 Nov. 3, 2022

(30) Foreign Application Priority Data
Jun. 28, 2019 (JP) .................... 2019-121121

(51) Int. Cl.
*H04N 5/93* (2006.01)
*G09B 21/00* (2006.01)

(52) U.S. Cl.
CPC .......... *H04N 5/9305* (2013.01); *G09B 21/009* (2013.01)

(58) Field of Classification Search
CPC ............................. H04N 5/9305; G09B 21/009
See application file for complete search history.

(56) References Cited

U.S. PATENT DOCUMENTS

| | | | | |
|---|---|---|---|---|
| 6,256,070 B1* | 7/2001 | Frank | ................ | H04N 7/0885 348/475 |
| 2016/0018973 A1* | 1/2016 | Meehan | ............ | G06F 3/04847 715/719 |
| 2016/0064037 A1* | 3/2016 | Miyazaki | ............ | H04N 5/775 386/241 |

FOREIGN PATENT DOCUMENTS

| | | |
|---|---|---|
| CN | 103139375 A | 6/2013 |
| CN | 206147183 U | 5/2017 |

(Continued)

OTHER PUBLICATIONS

Yamakawa et al., A Study of haptic interface to transmit emotion of the actors in a drama, IEICE Technical Report, Dec. 2014, pp. 23-27 (see International Search Report below for concise relevance).

(Continued)

*Primary Examiner* — Mishawn N. Hunter
(74) *Attorney, Agent, or Firm* — Paratus Law Group, PLLC

(57) ABSTRACT

There is provided an information processing apparatus, an information processing method, and a program that make it possible to assist deaf and hard-of-hearing people in viewing a video when the video is being played back. The information processing apparatus includes a controller. The controller generates at least one of an oscillation signal corresponding to sound-effect caption data or an oscillation signal corresponding to vocalization caption data on the basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption (Continued)

information, the sound data being included in the sound information.

11 Claims, 7 Drawing Sheets

(56) References Cited

FOREIGN PATENT DOCUMENTS

| | | |
|---|---|---|
| JP | H10271392 A | 10/1998 |
| JP | 2007101945 A | 4/2007 |
| JP | 2010-200085 A | 9/2010 |
| JP | 2015-053048 A | 3/2015 |
| JP | 2016-054398 A | 4/2016 |
| KR | 101564659 B1 | 10/2015 |
| WO | WO-2015194807 A1 | 12/2015 |
| WO | WO-2019098775 A1 | 5/2019 |

OTHER PUBLICATIONS

Jul. 7, 2020, International Search Report issued for related PCT application No. PCT/JP2020/019600.

* cited by examiner (A)

(B)

(A)

(B)

(A)

(B)

(A)

(B)

(C)

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/019600 (filed on May 18, 2020) under 35 U.S.C. § 371, which claims priority to Japanese Patent Application No. 2019-121121 (filed on Jun. 28, 2019), which are all hereby incorporated by reference in their entirety.

TECHNICAL FIELD

The present technology relates to an information processing apparatus, an information processing method, and a program that assist a viewer in viewing a video file.

BACKGROUND ART

A caption used to explain sound content is generally displayed on a video such as a movie or a drama that accommodates deaf and hard-of-hearing people, in order to assist deaf and hard-of-hearing people in viewing the video without sound information. Not only a vocalization of a person, but also a sound effect used to explain the situation is displayed in the form of the caption. However, it is difficult to represent, for example, the inflection and the volume of a voice of a character, and a speed of a vocalization of the character using a text-based caption.

Here, Patent Literature 1 discloses generating a haptic effect using an automated haptification algorithm. The automated haptification algorithm performs analysis to perform a pattern identification on audio and video tracks of a movie, in order to generate a haptic effect. In addition, an A/V receiver analyzes a closed caption text for a keyword. For example, when "explosion" is found as a keyword, the automated haptification algorithm looks for an explosion pattern around a time stamp of the found keyword, and further, the automated haptification algorithm generates a corresponding haptic effect such as a strong oscillation corresponding to an explosion. The A/V receiver outputs the haptic effect at a time corresponding to an event that occurs in the movie.

CITATION LIST

Patent Literature

Patent Literature 1: Japanese Patent Application Laid-open No. 2015-53048

DISCLOSURE OF INVENTION

Technical Problem

The technology disclosed in Patent Literature 1 makes it possible to provide, to a user, a haptic effect that corresponds to a so-called sound effect such as "explosion". However, it is difficult for deaf and hard-of-hearing people to recognize, for example, the voice inflection and a vocalization speed when people are having a talk.

It is an object of the present technology to provide an information processing apparatus, an information processing method, and a program that make it possible to assist deaf and hard-of-hearing people in viewing a video when the video is being played back.

Solution to Problem

In order to achieve the object described above, an information processing apparatus according to an embodiment of the present technology includes a controller.

The controller generates at least one of an oscillation signal corresponding to sound-effect caption data or an oscillation signal corresponding to vocalization caption data on the basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption information, the sound data being included in the sound information.

Such a configuration makes it possible to assist, using oscillation, a viewer in viewing a video file, since an oscillation signal that corresponds to a sound effect or a vocalization is generated on the basis of sound data.

The controller may divide the sound data into sound data corresponding to the sound-effect caption data and sound data corresponding to the vocalization caption data, and the controller may generate the oscillation signal corresponding to the sound-effect caption data on the basis of a waveform of the sound data corresponding to the sound-effect caption data, and may generate the oscillation signal corresponding to the vocalization caption data on the basis of a waveform of the sound data corresponding to the vocalization caption data.

The controller may determine whether the caption data is the sound-effect caption data or the vocalization caption data using at least one of display position information, mark information, font information, or color information that is included in the caption information, the display position information being information regarding a position at which a caption is displayed on an image, the mark information being information regarding a mark displayed on the image, the font information being information regarding a font of a word in the caption, the color information being information regarding a color of the word in the caption.

When the caption information includes caption information corresponding to a scene in which a plurality of persons is having a talk, the controller may partition, using the caption information and in order of vocalization in the talk, the vocalization caption data in the scene in which the plurality of persons is having the talk, and may generate the oscillation signal corresponding to each piece of vocalization caption data obtained by the partition.

The controller may generate the oscillation signal corresponding to the sound effect and the oscillation signal corresponding to the vocalization of the person such that there is a relative difference in magnitude between oscillation based on the oscillation signal corresponding to the sound effect and oscillation based on the oscillation signal corresponding to the vocalization of the person.

The video file may include content meta-information, and the controller may generate the oscillation signal in consideration of the content meta-information.

The controller may generate the oscillation signal in consideration of information regarding the user.

An oscillation providing section that provides oscillation to the user on the basis of the oscillation signal may be further included.

A plurality of the oscillation providing sections may be included.

The controller may generate the oscillation signal corresponding to the sound-effect caption data and the oscillation signal corresponding to the vocalization caption data using the result of analyzing the caption information and the sound information, and may output the generated oscillation signals to the different oscillation providing sections of the plurality of the oscillation providing sections.

In order to achieve the object described above, an information processing method according to an embodiment of the present technology includes generating at least one of an oscillation signal corresponding to sound-effect caption data or an oscillation signal corresponding to vocalization caption data on the basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption information, the sound data being included in the sound information.

In order to achieve the object described above, a program according to an embodiment of the present technology causes an information processing apparatus to perform a process including: analyzing caption information and sound information that are included in a video file, the caption information including caption data that includes sound-effect caption data and vocalization caption data, the sound information including sound data, the sound-effect caption data being used to represent a sound effect in the form of text information, the vocalization caption data being used to represent a vocalization of a person in the form of text information; and generating at least one of an oscillation signal corresponding to the sound-effect caption data or an oscillation signal corresponding to the vocalization caption data on the basis of a waveform of the sound data using a result of the analysis.

MODE(S) FOR CARRYING OUT THE INVENTION

[Overview of Oscillation Providing System]

Figure 1:
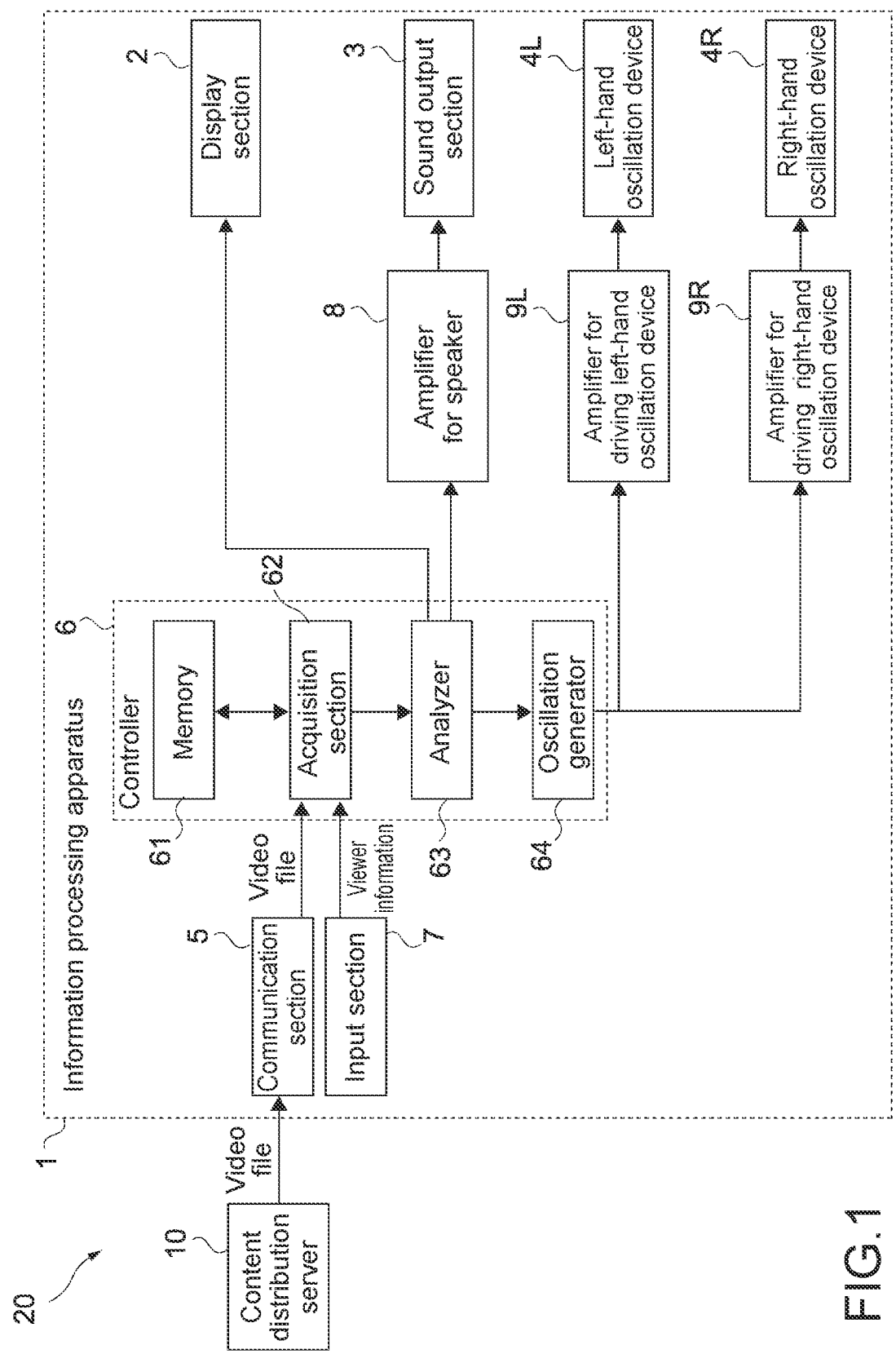
FIG. 1 schematically illustrates a configuration of an oscillation providing system.
Figure 2:
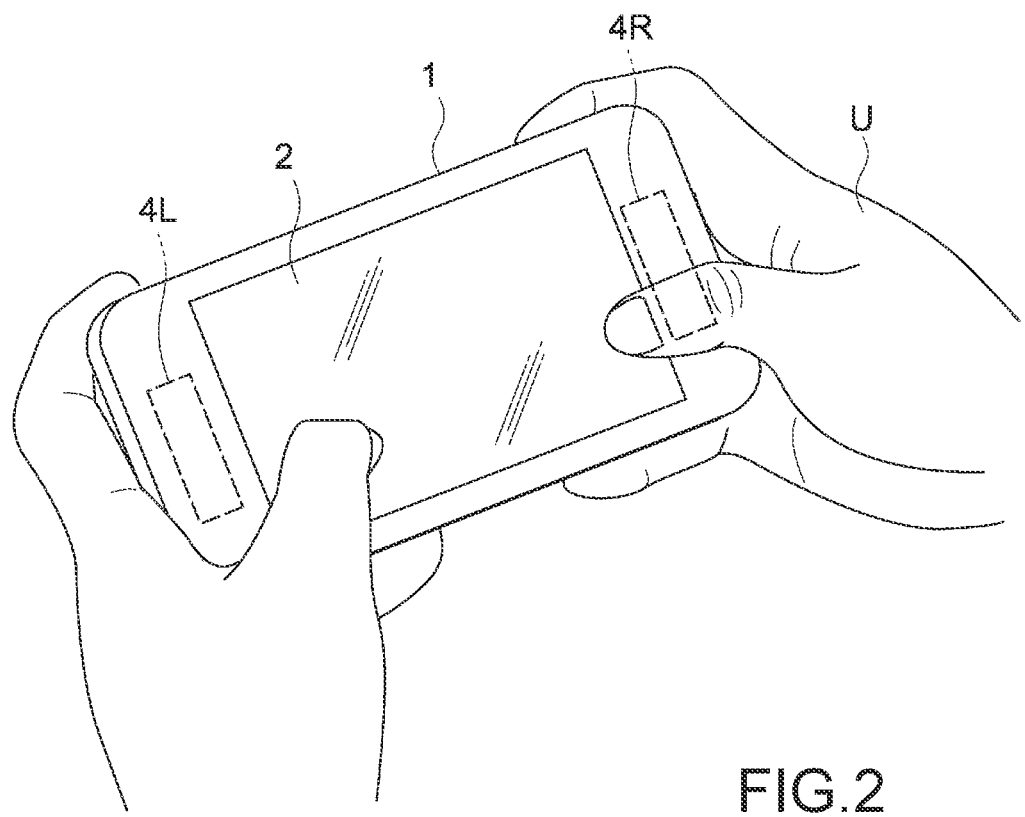
FIG. 2 is a perspective view illustrating a state in which a user is using an information processing apparatus that is a portion of the oscillation providing system and includes an oscillation providing device.

An oscillation providing system according to embodiments of the present technology is described using FIGS. 1 and 2.

FIG. 1 illustrates a configuration of the oscillation providing system and includes a functional block diagram of an information processing apparatus that is a portion of the oscillation providing system.

FIG. 2 is a perspective view illustrating a state in which a user U is using the information processing apparatus including an oscillation providing device.

The oscillation providing system of the present embodiment assists a deaf or hard-of-hearing user U (hereinafter referred to as a viewer in some cases) in understanding, for example, a sound representation when the user U uses video content such as a movie, a TV drama, and a game.

More specifically, oscillation that corresponds to sound is provided to the user U in real time, using sound information and caption information of a video file that includes the sound information, video information, and the caption information. In the present embodiment, oscillation that corresponds to a sound effect and oscillation that corresponds to a vocalization of a person are separately generated. Thus, in the case of, for example, a movie, a viewer knows, by oscillation, the inflection and the volume of a voice of a character in the movie, a speed of a vocalization of the character, the volume and the duration time of a sound effect, and a change in volume. This enables the viewer to more deeply understand the situation in the movie.

For example, when "explosion sound" used to explain a sound effect is displayed on an image in the form of a caption used to explain sound content in order to assist the deaf or hard-of-hearing user U in viewing a video without sound information, the viewer does not know, only by caption information, whether the explosion sound is sound of rumbling of the earth that is continuous low sound, or momentary loud sound.

In the present embodiment, an oscillation signal is generated on the basis of a waveform of sound data of a sound effect, and this makes it possible to provide the type of explosion sound to a user using oscillation. This enables the user U to deeply understand the situation in a movie.

Further, the following is another example. When a caption for a vocalization of a person is displayed, it may be difficult to understand feelings of the person only using caption information. In the present embodiment, oscillation is generated on the basis of a waveform of sound data of a vocalization of a person, and this makes it possible to provide the inflection and the volume of a voice of the person, and a speed of a vocalization of the person using oscillation. This enables the user U to deeply understand the situation in a movie.

This is described in detail below.

As illustrated in FIG. 1, an oscillation providing system 20 includes an information processing apparatus 1 and a content distribution server 10.

When a video file distributed by the content distribution server 10 is being played back, the oscillation providing system 20 provides oscillation to a viewer in real time on the basis of caption information and sound information that are included in the video file.

In the oscillation providing system 20, the information processing apparatus 1 and the content distribution server 10 are connected to each other through a network such as the Internet to be capable of communicating with each other. The information processing apparatus 1 transmits, to the content distribution server 10, a request that list data be acquired, and a request that a video (referred to as a video file in some cases) be downloaded. Further, the content distribution server 10 transmits, for example, the list data and the video file to the information processing apparatus 1.

An example of providing oscillation when a downloaded video is being played back, on the basis of caption information and sound information that are included in the video file, is described below.

(Content Distribution Server)

The content distribution server 10 holds paid or free content data. The content distribution server 10 provides a video file. When the information processing apparatus 1 accesses the content distribution server 10, a list of content is displayed on a display section 2 that is included in the information processing apparatus 1 and will be described later. When the user U selects content, a video file of the content is downloaded from the content distribution server 10.

The video file includes content meta-information, caption information, video information, and sound information.

The content meta-information includes, for example, category information regarding a category of a video, type information regarding the type of video, and status information regarding a status of broadcasting.

Examples of the category of a video include a movie, sports, an animation, and news. Examples of the type of video include action, SF, and love. Examples of the status of broadcasting includes during a program and during a commercial break.

The video information includes video data. Examples of information included in the video data include object information regarding an object such as a vehicle, a train, a gun, and a person; feeling information regarding human feelings such as delight, anger, sorrow, and pleasure; movement information regarding a movement of an object such as a stop and a quick movement; flash information regarding a flash at the time of explosion or foaming; and sign-language information.

The sound information includes, for example, sound data, the number of sound channels, sound-source-position information, and second-audio-channel information.

The sound data includes, for example, frequency information and information regarding a change in sound pressure. The frequency information provides information regarding a sound pitch such as a high pitch and a low pitch. The information regarding a change in sound pressure provides information regarding the loudness of sound such as an explosion sound and a powerful sound effect.

Examples of the second-audio-channel information include not only sound data of a language of a second audio channel in bilingual broadcasting, but also a voice-over and the like for visually disabled people.

The caption information includes, for example, caption data, display position information regarding a position at which a caption is displayed on an image, mark information regarding a mark displayed on an image, font information regarding a font of a word in a caption, and color information regarding a color of a word in a caption.

The caption data is caption text data. The caption data includes two types of pieces of caption data that are vocalization caption data used to represent a vocalization of a person in the form of text information, and auxiliary caption data.

The auxiliary caption data is caption data used to assist a viewer in understanding video content. The auxiliary caption data includes sound-effect caption data used to explain a sound effect in the form of text information, and situation explaining caption data.

The sound-effect caption data is used in essence to explain sound that is not a vocalization of a person. Examples of a sound effect include not only environmental sounds actually emitted when a video is being played back, such as a horn of a vehicle, sound that notifies of the arrival of an elevator, barking of a dog, sound of a door opening and closing, and an explosion sound, but also sounds for, for example, feelings of a person and narration that are emitted as a vocalization of the person when a video is being played back, but are not an actual vocalization of the person.

The situation explaining caption data assists in understanding the situation for which sound is not emitted when a video is being played back. For example, in a scene in which a plurality of persons is having a talk, a name or the like of a person of a vocalization is displayed in parentheses or brackets in a caption before a text corresponding to a vocalization of the person. This name of the person corresponds to the situation explaining caption data. Such situation explaining caption data enables a viewer to understand which vocalization is a vocalization of which person. Note that, when a word displayed in parentheses or brackets is a name of a person, a name of a woman and a name of a man may be displayed in different colors such as the name of a woman being displayed in red and the name of a man being displayed in blue, such that the gender of the person can be determined. The color of a word displayed in parentheses or brackets makes it possible to determine whether caption data is situation explaining caption data.

(Configuration of Information Processing Apparatus)

The information processing apparatus 1 accesses the content distribution server 10, and downloads a video file. The information processing apparatus 1 includes an application program used to generate an oscillation signal for oscillation that is provided to a user using caption information and sound information that are included in the video file.

For example, the information processing apparatus 1 may be a cellular phone, a personal digital assistant (PDA), or a portable game machine. Here, a cellular phone is described as an example of an information processing apparatus that includes an oscillation device that is an oscillation providing section, and a display section.

The information processing apparatus 1 may include a communication function using a wireless communication system such as a wireless local area network (LAN) or a cellular phone. Further, the information processing apparatus 1 may be configured to communicate with the content distribution server by being connected to an external apparatus using a priority cable such as a USB cable.

As illustrated in FIG. 2, the information processing apparatus 1 of the present embodiment includes the display section 2 being long sideways, and is held by the user U in his/her hands in a so-called state of being held to be long sideways. The information processing apparatus 1 includes a left-hand oscillation device 4L and a right-hand oscillation device 4R. In a state in which the information processing apparatus 1 is held by the user U, the left-hand oscillation device 4L is situated correspondingly to the left hand of the user U, and the right-hand oscillation device 4R is situated correspondingly to the right hand of the user U. The left-hand oscillation device 4L is driven to oscillate on the basis of an oscillation signal output by a controller 6 described later. This results in providing oscillation to the left hand of the user U. Likewise, the right-hand oscillation device 4R is driven to oscillate on the basis of an oscillation signal output by the controller 6. This results in providing oscillation to the right hand of the user U.

Here, the oscillation devices are referred to as oscillation devices 4L and 4R when there is no particular need to distinguish between the left-hand oscillation device 4L and the right-hand oscillation device 4R.

The information processing apparatus 1 of the present embodiment outputs a waveform of an input sound signal as oscillation.

As illustrated in FIG. 1, the information processing apparatus 1 includes the display section 2, a sound output section 3, the left-hand oscillation device 4L, the right-hand oscillation device 4R, a communication section 5, the controller 6, an input section 7, an amplifier 8 for a speaker, an amplifier 9L for driving a left-hand oscillation device, and an amplifier 9R for driving a right-hand oscillation device.

The display section 2 displays thereon various information such as video data of played-back content and a list of content as a test or in the form of an image. The display section 2 includes, for example, a cathode-ray tube (CRT) display, a liquid crystal display (LCD), or an organic light-emitting diode (OLED).

The display section 2 displays thereon an image based on video data and caption data that are output by the controller 6.

The sound output section 3 is, for example, a speaker and a headphone. The sound output section 3 changes, for example, sound data output by the controller 6 to sound, and outputs the sound.

The oscillation device 4L, 4R is driven on the basis of an oscillation signal output by the controller 6 to provide oscillation to a user. The oscillation signal is generated by an oscillation generator 64 described later, on the basis of a waveform of sound data of a video file.

An oscillator such as an electromagnetic oscillator that can follow oscillation in a frequency band of a sound signal up to about 20 kHz, is used as the oscillation device 4. A known device such as an eccentric-motor actuator or a linear resonant actuator may be used as the oscillation device 4.

The information processing apparatus 1 of the present embodiment includes the two oscillation devices 4L and 4R.

The communication section 5 transmits information to and receives information from an external apparatus. For example, the communication section 5 is connected to the external apparatus through, for example, a LAN, Bluetooth (registered trademarks), or Wi-Fi to be capable of communicating with the external apparatus, and transmits and receives information. The information processing apparatus 1 of the present embodiment receives a video file from the content distribution server 10 corresponding to the external apparatus.

The controller 6 controls the information processing apparatus 1. The controller 6 generates an oscillation signal for the oscillation device 4 using caption information and sound information that are included in an acquired video file, and outputs the oscillation signal to the oscillation device 4. Further, the controller 6 outputs video data and caption data to the display section 2, and outputs sound data to the sound output section 3. The controller 6 will be described in detail later.

The input section 7 is an interface used to perform input to the information processing apparatus 1. Through the input section 7, a user can input viewer information that is user information.

The viewer information includes attribute information regarding an attribute of a viewer who is a user, and viewing-environment information.

Examples of the attribute information regarding an attribute of a viewer include a hearing loss state, an age, and an oscillation preference of a viewer.

The hearing loss state of a viewer is a degree of hearing loss in each of the left and right ears, such as difficulty in hearing in both ears, difficulty in hearing only in the right ear, and a total inability to hear in the left ear.

The viewing-environment information is environment information regarding an environment around a viewer when the viewer is viewing content using the information processing apparatus 1. Examples of the environment include indoors, outdoors, and during traveling by, for example, car or train.

The magnitude of oscillation may be adjusted by performing a comprehensive determination on the basis of the viewer information.

The type of the input section 7 is not limited, and the input section 7 may be any known input section. In the present embodiment, a touch panel is used as the input section 7, and the touch panel is provided on a display surface of the display section 2. Other examples of the input section 7 include a mouse, a keyboard, and a switch.

The amplifier 8 for a speaker amplifies sound data output by the controller 6, and outputs the amplified sound data to the sound output section 3.

The amplifier 9L for driving a left-hand oscillation device amplifies a left-hand oscillation signal that is output by the controller 6, and outputs the amplified signal to the left-hand oscillation device 4L.

The amplifier 9R for driving a right-hand oscillation device amplifies a right-hand oscillation signal that is output by the controller 6, and outputs the amplified signal to the right-hand oscillation device 4R.

The controller 6 is described.

The controller 6 includes a memory 61, an acquisition section 62, an analyzer 63, and the oscillation generator 64.

The acquisition section 62 acquires a video file that is received from the content distribution server 10 through the communication section 5, and viewer information that is input through the input section 7.

The memory 61 stores therein a program and various data that are used when processing is performed by the controller 6, and various data, such as the viewer information acquired by the acquisition section 62, that is acquired from the outside.

The analyzer 63 analyzes caption information and sound information that are included in a video file.

More specifically, the analyzer 63 analyzes the caption information when a video is being played back, and divides caption data into vocalization caption data and sound-effect caption data using at least one of display position information regarding a position at which a caption is displayed on an image, a mark state regarding a mark displayed on an image, font information regarding a font in a caption, or color information regarding a color of a word in a caption. In this case, the analyzer 63 performs analysis to determine that caption data that is displayed in an upright font, is not in parentheses or brackets, and is horizontally displayed is vocalization caption data, and caption data other than the vocalization caption data is auxiliary caption data. Further, the analyzer 63 performs analysis to determine that, from among the auxiliary caption data, data of a caption displayed using a word in red or blue in parentheses or brackets is situation explaining caption data, and caption data other than the situation explaining caption data is the effect caption data.

Here, with reference to an example of displaying a caption on a video, how to distinguish between sound-effect caption data and vocalization caption data is described using figures. (A) of FIG. 5, (A) of FIG. 6, (A) of FIG. 7, and (A) to (C) of FIG. 8 each illustrate a scene in a video, and are diagrams for describing an example of displaying a caption on an image.

In the case of a video, such as a Japanese movie, in which the Japanese language in which a text can be horizontally written and can be vertically written is primarily used for a caption, it is possible to determine whether caption data is vocalization caption data or sound-effect caption data according to the position at which a caption is displayed on an image.

Figure 5:
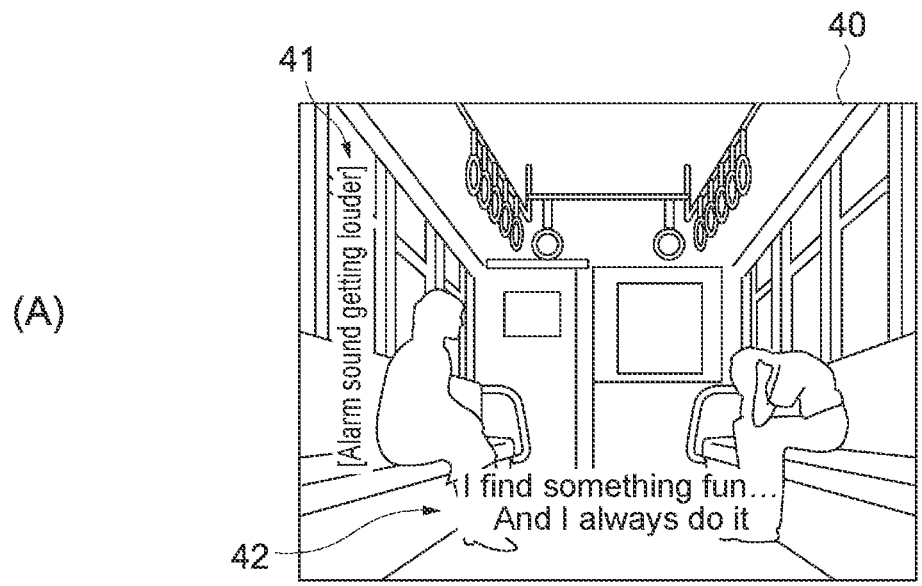
FIG. 5 illustrates an example of a scene that is included in a video and on which a caption is displayed; a sound waveform of a vocalization of a person and a sound waveform of a sound effect in the scene; and waveforms of oscillation signals respectively generated on the basis of the respective sound waveforms.
Figure 5:
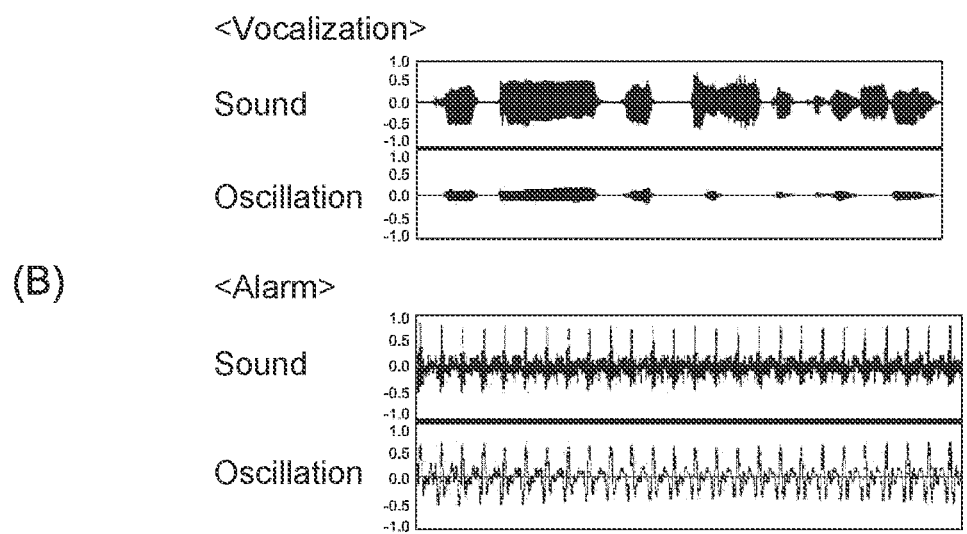

For example, in a scene 40 of (A) of FIG. 5 that is included in a video in which the Japanese language is used for a caption, vocalization caption data 42 is horizontally displayed, and sound-effect caption data 41 that is used to explain an alarm sound that corresponds to a sound effect, is vertically displayed. As described above, it is possible to determine whether caption data is vocalization caption data or sound-effect caption data according to the position at which a caption is displayed on an image.

Further, caption data can be divided into vocalization caption data and auxiliary caption data using a mark displayed on an image.

For example, in the scene 40 of the video illustrated in (A) of FIG. 5, sound-effect caption data 41 is displayed in brackets, whereas marks such as brackets are not used for the vocalization caption data 42.

Figure 7:
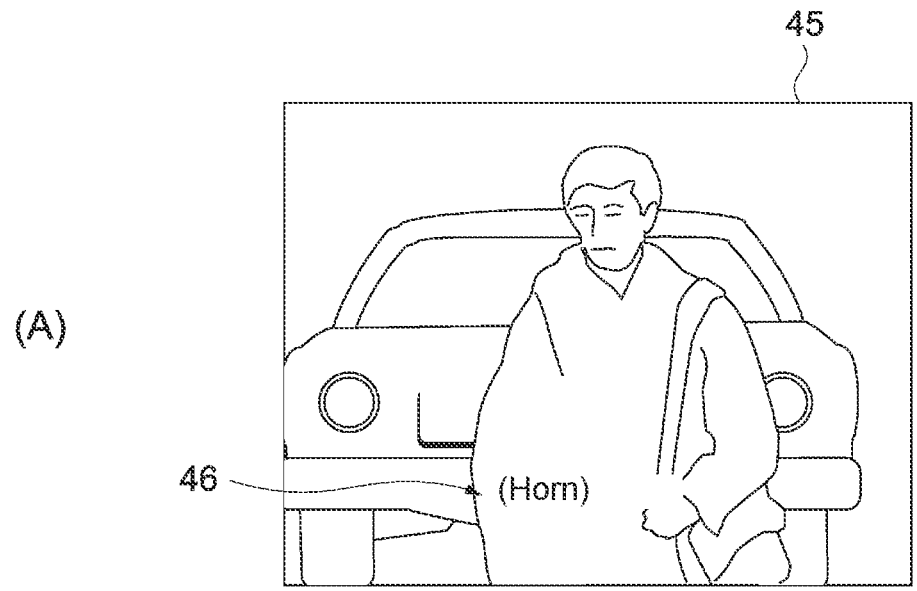
FIG. 7 illustrates an example of a scene that is included in yet another video and on which a caption is displayed, a sound waveform of a sound effect in the scene, and a waveform of an oscillation signal generated on the basis of the sound waveform.
Figure 7:
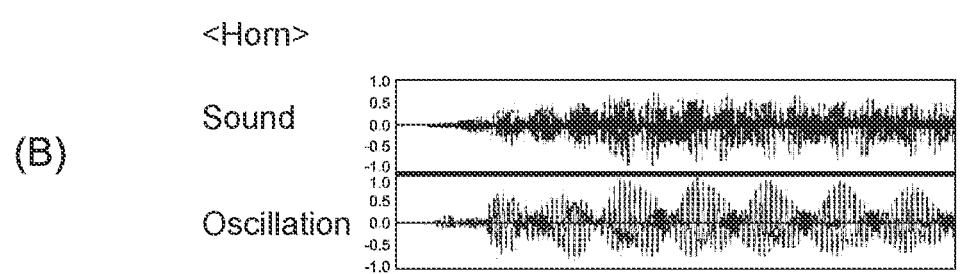

Further, in a scene 45 of (A) of FIG. 7 that corresponds to an example of a video in which the Japanese language is used for a caption, auxiliary caption data 46 that is used to explain a sound of a horn of a vehicle that corresponds to a sound effect, is horizontally displayed in parentheses.

Figure 8:
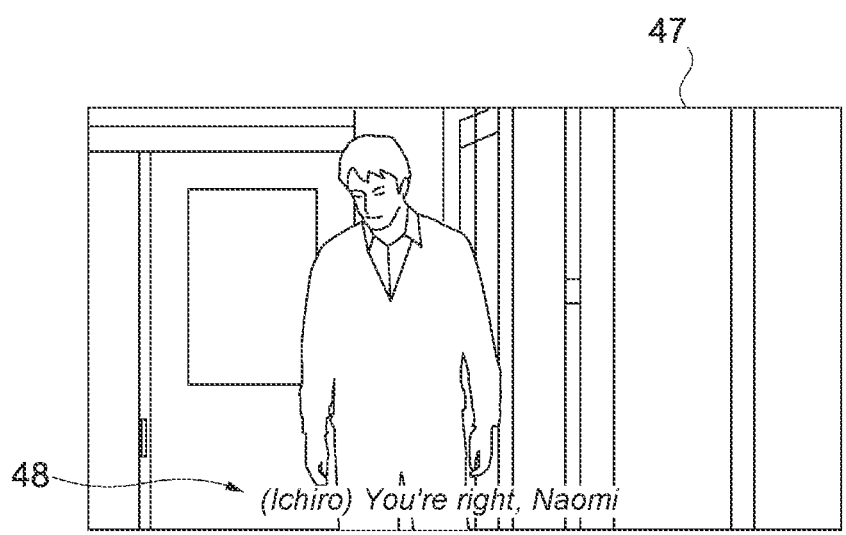
FIG. 8 illustrates examples of scenes that are included in another video and on which a caption is displayed.
Figure 8:
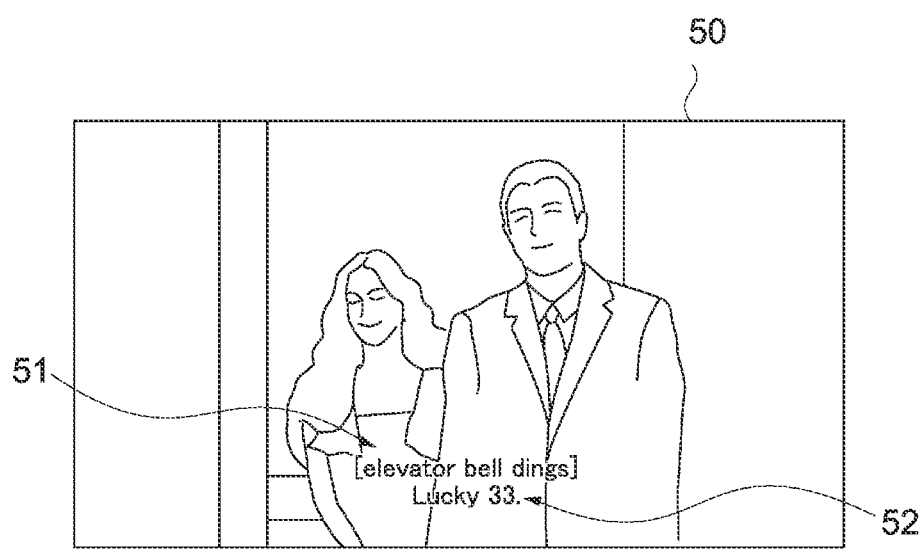
Figure 8:
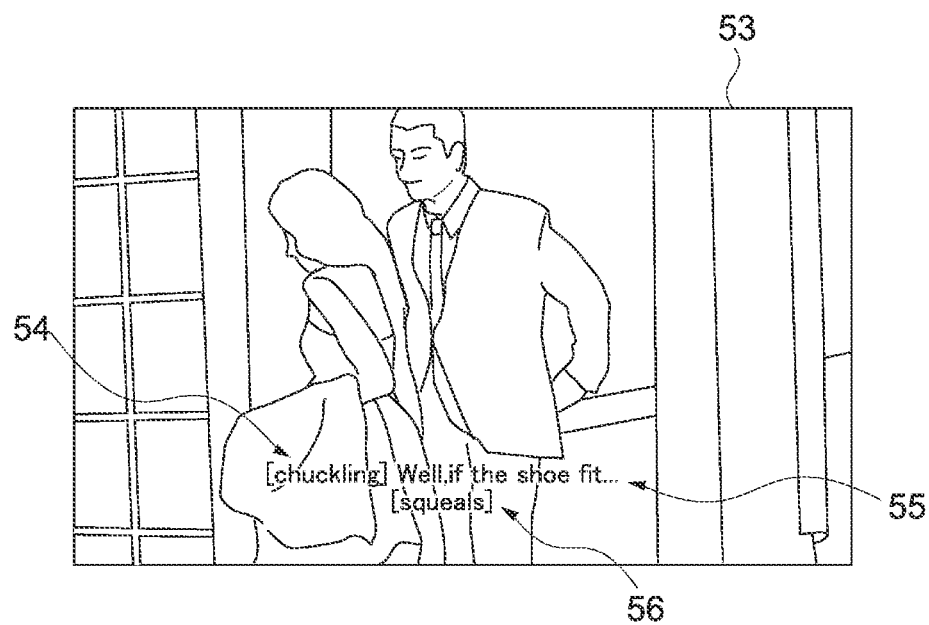

Further, in a scene 50 of (B) of FIG. 8 that corresponds to an example of a video, such as a movie in a foreign language, in which a horizontally written language is primarily used for a caption, auxiliary caption data 51 used to represent a sound of an elevator that corresponds to a sound effect, is displayed in brackets, whereas marks such as brackets are not used for vocalization caption data 52.

Furthermore, in a scene 53 of (C) of FIG. 8 that corresponds to an example of a video of a movie in a foreign language, auxiliary caption data 54 used to represent a chuckle of a person that corresponds to a sound effect, and sound-effect caption data 56 used to represent a squeaking sound of a door that corresponds to a sound effect, are displayed in brackets, whereas marks such as brackets are not used for vocalization caption data 55.

As described above, the use of marks such as parentheses or brackets makes it possible to distinguish between vocalization caption data and auxiliary caption data. Note that, in the scene 40 of (A) of FIG. 5, the caption data can be determined to be the sound-effect caption data 41 due to being vertically displayed in addition to being displayed in brackets.

Further, auxiliary caption data can be divided into sound-effect caption data and situation explaining caption data using a color of a word in a caption in parentheses or brackets (marks) displayed on an image, in addition to using the parentheses or brackets.

When a word in parentheses or brackets is in red or blue, the word in parentheses or brackets can be determined to be situation explaining caption data. When the word in parentheses or brackets is not in red or blue, the word in parentheses or brackets can be determined to be sound-effect caption data.

In each of the scenes 45, 47, and 50 respectively illustrated in (A) of FIG. 7, (B) of FIG. 8, and (C) of FIG. 8, a word in parentheses or brackets is displayed in a color that is not red or blue. Thus, the caption in parentheses or brackets can be determined to be sound-effect caption data.

Figure 6:
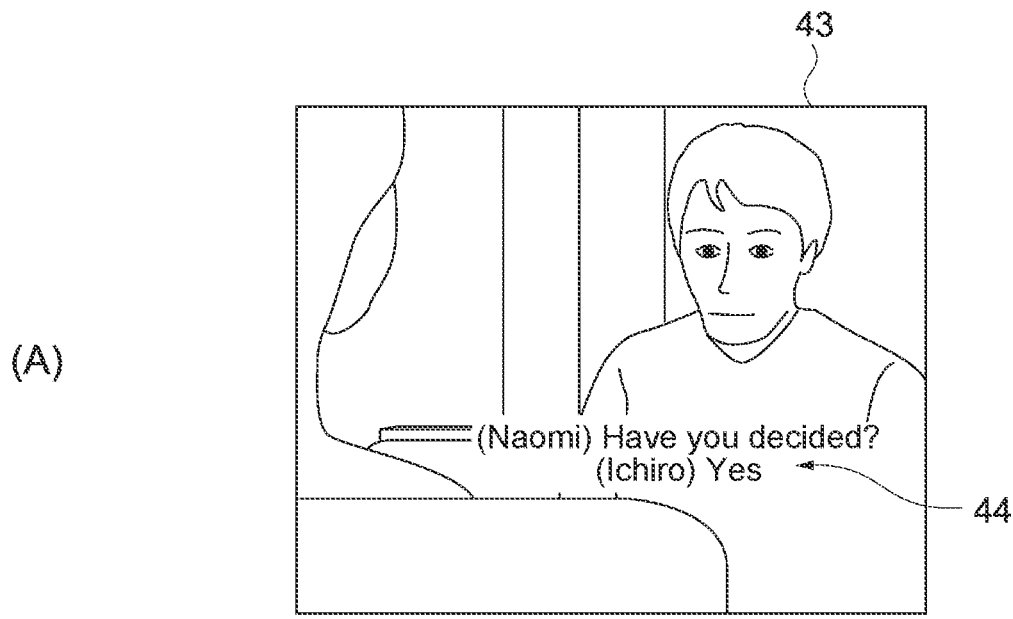
FIG. 6 illustrates an example of a scene that is included in another video and on which a caption is displayed, sound waveforms of vocalizations of people in the scene, and waveforms of oscillation signals respectively generated on the basis of the respective sound waveforms.
Figure 6:
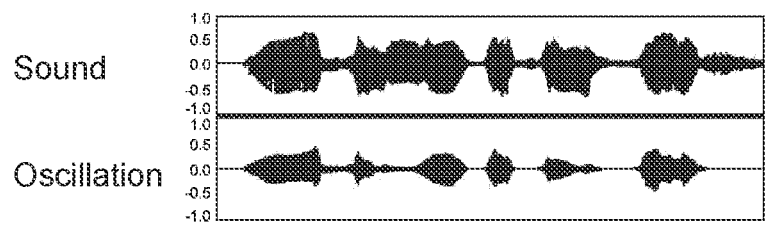
Figure 6:
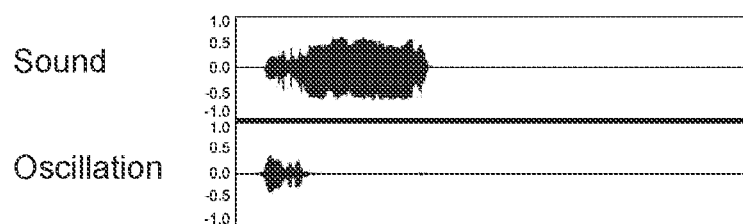

On the other hand, a scene 43 of (A) of FIG. 6 that is included in a video in which the Japanese language is used in a caption, is a scene in which two people are having a talk, and a name of a person is displayed in parentheses as a caption such that a viewer understands which vocalization is a vocalization of which person. In (A) of FIG. 6, "Naomi" in parentheses, one of the commonly used names of Japanese women, is displayed in red, and "Ichiro" in parentheses, one of the commonly used names of Japanese men, is displayed in blue. Thus, the captions in the parentheses can be determined to be situation explaining caption data since the colors of words in the parentheses in the captions are red or blue.

Further, in a caption in a scene 47 of (A) of FIG. 8 that is included in a video in which the Japanese language is used in a caption, a name of a person is displayed in parentheses, and a color of the name of the person is blue. Thus, the caption in parentheses can be determined to be situation explaining caption data since the color of a word in the caption in parentheses is red or blue.

As described above, caption data can be divided into sound-effect caption data and situation explaining caption data using a color of a word in a caption.

Note that, when sound-effect caption data and situation explaining caption data are not distinguished from each other by color, the analyzer described later may perform analysis to determine whether a word displayed in parentheses or brackets is a name of a person. In this case, for example, person's name data that includes a plurality of names of persons is stored in advance in the memory 61 described later, and the analyzer 63 described later can determine whether a word in parentheses or brackets is a name of a person by referring to the person's name data. When the word in parentheses or brackets has been determined to be a name of a person, a caption in parentheses or brackets can be determined to be situation explaining caption data.

Further, when a word in parentheses represents a name of a person in the scene 43 in which a plurality of persons is having a talk, a text corresponding to a vocalization of the person is displayed after the name of the person in parentheses. For example, as illustrated in (A) of FIG. 6, a caption of "(Naomi) Have you decided? (Ichiro) Yes" is displayed. In this case, vocalization caption data can be partitioned in order of vocalization in the talk using information regarding parentheses (mark information). Specifically, the vocalization caption data can be partitioned into vocalization caption data of "Have you decided?" and vocalization caption data of "Yes". Accordingly, pieces of vocalization data of different people can be distinguished from each other.

Furthermore, caption data can be divided into vocalization caption data and auxiliary caption data using a font of a word in a caption.

For example, in the scene 40 of (A) of FIG. 5, a text corresponding to a vocalization of a person is displayed in an upright-type font that is an upright font without slanting. On the other hand, in the scene 47 of (A) of FIG. 8 that is included in a video in which the Japanese language is used in a caption, auxiliary caption data 48 is displayed in an oblique-type font that is an oblique font, the auxiliary caption data 48 being used to represent a sound for feelings of a person that is emitted as a vocalization of the person when the video is being played back, but is not an actual vocalization of the person.

Thus, a portion corresponding to a caption that is not in parentheses or brackets and is in an oblique font can be determined to be sound-effect caption data. Further, a portion corresponding to a caption that is not in parentheses or brackets and is in an upright font can be determined to be vocalization caption data.

As described above, a portion corresponding to a caption in an oblique font can be determined to be auxiliary caption data. A portion corresponding to a caption that is not in parentheses or brackets in addition to being in an oblique font can be determined to be sound-effect caption data. A caption that is in parentheses or brackets and is displayed in red or blue can be determined to be situation explaining caption data, and a caption that is displayed in a color other than red and blue can be determined to be sound-effect caption data.

As described above, sound-effect caption data and vocalization caption data can be distinguished from each other by a font of a caption, the sound-effect caption data being used to represent a sound effect corresponding to a sound for feelings of a person or narration that is emitted as a vocalization of the person when a video is being played back, but is not an actual vocalization of the person.

As described above, caption data can be divided into sound-effect caption data and vocalization caption data by the analyzer 63 analyzing caption information regarding a caption of a video file.

Further, the analyzer 63 analyzes sound data, and divides the sound data into sound data of a vocalization of a person and sound data of a sound effect.

Sound data of a vocalization of a person and sound data of a sound effect can be separated from each other by making use of, for example, a difference in volume and frequency. Moreover, the separation can be performed on the basis of a database constructed by machine learning using a large number of pieces of sound data of a vocalization and a large number of pieces of sound data of a sound effect.

The oscillation generator 64 generates an oscillation signal on the basis of a result of analysis performed by the analyzer 63. The oscillation generator 64 generates an oscillation signal that corresponds to a vocalization of a person on the basis of a waveform of sound data that corresponds to the vocalization, and generates an oscillation signal that corresponds to a sound effect on the basis of a waveform of sound data that corresponds to the sound effect.

Further, in the present embodiment, the oscillation generator 64 outputs the oscillation signal corresponding to a vocalization of a person to the right-hand oscillation device 4R, and outputs the oscillation signal corresponding to a sound effect to the left-hand oscillation device 4L. The oscillation generator 64 outputs an oscillation signal that corresponds to sound data when a video is being played back, that is, when the sound data is being reproduced.

For example, the method for generating an oscillation signal used to drive an oscillator (an oscillation device), which is disclosed in Japanese Patent Application Laid-Open No. 2008-283305, can be used to generate an oscillation signal. More specifically, from a time waveform of a sound signal for which sound data is being reproduced, the spectrogram of the sound signal at the same time is acquired. The spectrogram shows a temporal change in the spectrum of a sound signal relative to the frequency, where the vertical axis represents frequency and the horizontal axis represents time. The timing of generating a high-intensity spectrum that occurs instantaneously over a wide range of frequencies of the spectrogram, is extracted. Specifically, a time derivative for a spectrum is obtained, and the timing at which an obtained value, that is, an amount of a temporal change in spectrum, is large is extracted to acquire a time-derivative value as a degree of intensity, and an oscillation signal is generated that has a waveform in which oscillation occurs with an amplitude corresponding to the degree of intensity. The oscillation signal generated as described above is referred to as an oscillation signal according to basic settings.

As described above, an oscillation signal is generated on the basis of a waveform of sound data. Thus, in the case of, for example, oscillation that corresponds to a vocalization of a person, the inflection and the volume of a vocalization of a person, a speed of the vocalization, and the like are reflected in the oscillation. Thus, the oscillation enables a viewer to easily imagine, for example, feelings of a person, and to more deeply understand the situation in a scene. This makes it possible to assist the viewer in viewing.

Likewise, in the case of oscillation that corresponds to a sound effect, the volume of a sound effect such as a sound of a horn of a vehicle and an explosion sound, a change in the volume, the duration time of the sound, and the like are reflected in the oscillation occurring due an oscillation signal that is generated on the basis of a waveform of sound data. Thus, the oscillation enables a viewer to more deeply understand the situation. This makes it possible to assist the viewer in viewing.

Further, the oscillation generator 64 may adjust an oscillation signal according to basic settings to generate an oscillation signal, on the basis of a result of analyzing caption information.

The following is a specific example. The oscillation generator 64 may adjust and generate an oscillation signal such that oscillation that corresponds to a vocalization of a person is weaker than oscillation according to basic settings in the oscillation device 4. The oscillation generator 64 may further adjust and generate an oscillation signal such that oscillation that corresponds to a sound effect is relatively weaker than the oscillation corresponding to a vocalization of a person. In general, the period of time of a vocalization of a person tends to be long, and there is a possibility that a viewer will feel uncomfortable if a strong oscillation is correspondingly provided for a long time. Thus, for example, when an oscillation signal according to basic settings that is generated as described above on the basis of sound data that corresponds to a vocalization of a person, is adjusted to generate an oscillation signal, such that the amplitude of a waveform is made lower, this makes it possible to provide a more comfortable viewing.

Furthermore, the following is another specific example. The oscillation generator 64 may adjust an oscillation signal according to basic settings to generate an oscillation signal, such that the frequency of oscillation that corresponds to a vocalization of a woman is higher than the frequency of oscillation that corresponds to a vocalization of a man. In general, an adult woman has a higher voice than an adult man. Thus, it is possible to intuitively grasp, according to whether the frequency is high, which of a vocalization of a man and a vocalization of a woman the oscillation in a scene in which the man and the woman are having a talk, corresponds to.

Further, an oscillation signal may be generated using content meta-information in addition to using caption information and sound information. For example, when the content meta-information indicates action as the type of video, an oscillation signal may be generated only for a sound effect without being generated for a vocalization of a person. This makes it possible to provide a dynamic oscillation signal depending on the action scene in the entirety of the video.

[Method for Generating Oscillation]

Figure 3:
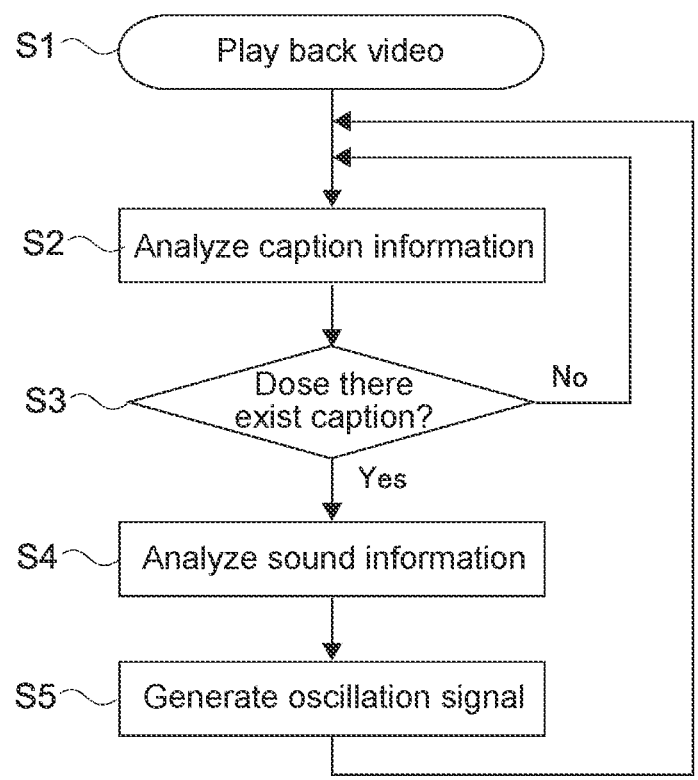
FIG. 3 is a diagram of a basic flow of a method for generating oscillation.

Next, a method for generating oscillation that is performed by the controller 6 is described using FIG. 3.

FIG. 3 is a diagram of a basic flow of a method for generating oscillation.

First, a video file is acquired by the acquisition section 62, and a video is played back (S1).

Next, analysis is performed by the analyzer 63 regarding the presence or absence of caption information in the video file (S2), and it is determined whether there is the caption information (S3).

When the caption information is analyzed, it is determined the presence or absence of the caption information. Further, when there is the caption information, caption data is divided by the analyzer 63 into sound-effect caption data and vocalization caption data using display position information regarding a position at which a caption is displayed on an image, mark information regarding a mark displayed on an image, font information regarding a font of a word in a caption, and color information regarding a color of a word in a caption that are included in the caption information. Furthermore, in the case of a scene in which a plurality of persons is having a talk, vocalization caption data is partitioned in order of vocalization in the talk according to the position of parentheses or brackets.

When it has been determined that there is no caption information (No), the process returns to S2, and the processes of S2 and S3 are repeated. When it has been determined that there is the caption information (Yes), the process moves on to S4.

In S4, sound information that is included in the video file is analyzed by the analyzer 63 (S3).

When it has been determined by the analyzer 63 as a result of the analysis of the caption information that there are both sound-effect caption data and vocalization caption data, sound data that corresponds to a sound effect and sound data that corresponds to a vocalization of a person are separated from each other by the sound information being analyzed, and the pieces of sound data are respectively associated with the sound-effect caption data and the vocalization caption data.

Further, when it has been determined by the analyzer 63 as a result of the analysis of the caption information that there is only one of the sound-effect caption data and the vocalization caption data, there is no need for the separation of sound data, and the caption data is associated with sound data.

Next, an oscillation signal is generated by the oscillation generator 64 on the basis of results of analyzing the caption information and the sound information, and is output to the oscillation device by the oscillation generator 64 (S5). In other words, the oscillation signal corresponding to a sound effect is generated on the basis of a waveform of sound data that corresponds to the sound effect, the oscillation signal corresponding to a vocalization is generated on the basis of a waveform of sound data that corresponds to the vocalization, and the oscillation signals are output to the respective oscillation devices.

For example, processing of generating oscillation is started when a viewer holds the information processing apparatus 1 serving as an oscillation providing device, and is terminated when the viewer takes his/her hands off the information processing apparatus 1. Further, when there is no caption on a screen, control is performed to prevent oscillation from being generated by the oscillation device 4L, 4R.

Figure 4:
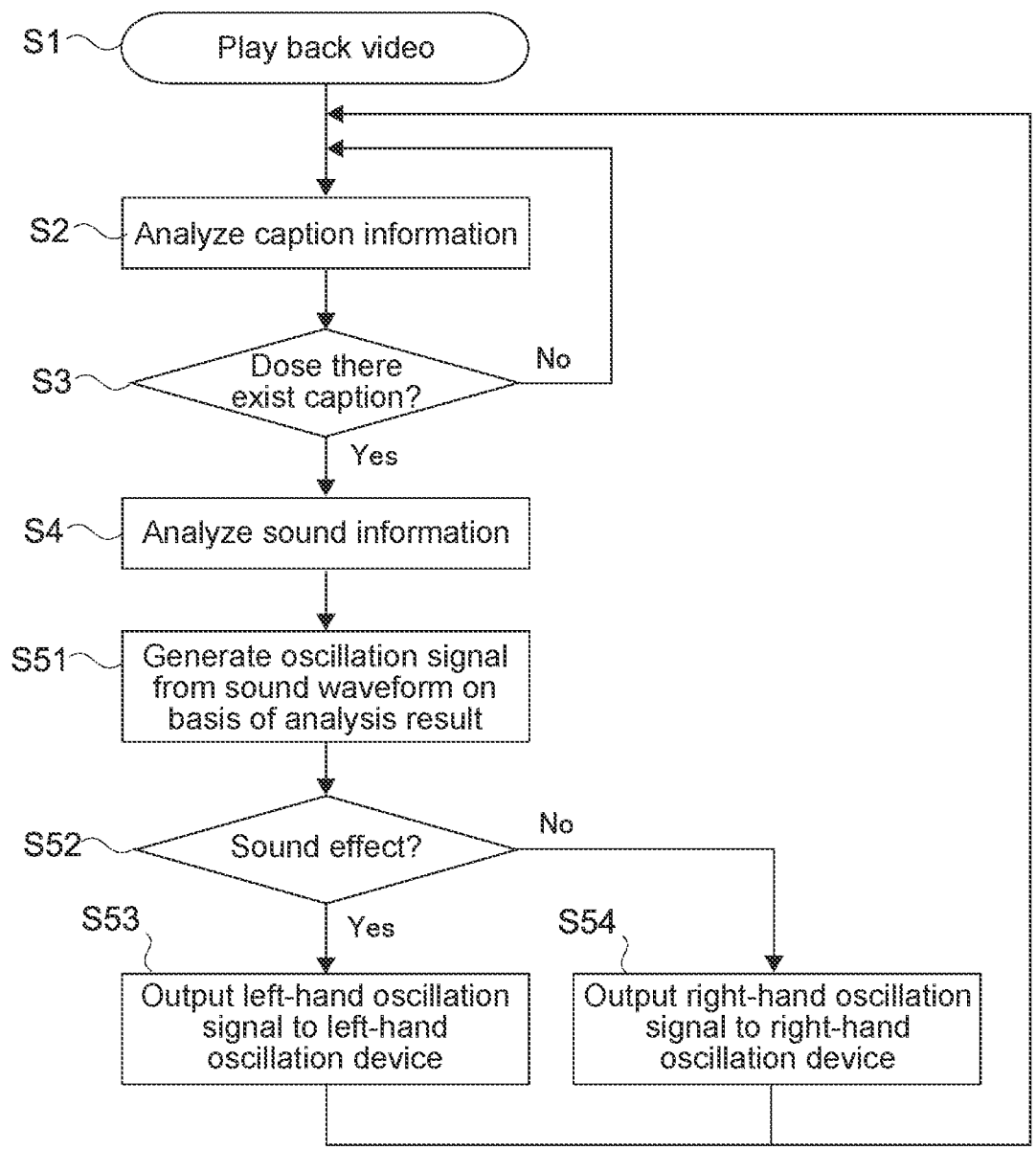
FIG. 4 is a diagram of a flow of an example of generating oscillation.

Next, a specific example of a method for generating an oscillation signal is described using FIG. 4.

Here, an example in which oscillation that corresponds to a sound effect is output to the left-hand oscillation device 4L and oscillation that corresponds to a vocalization is output to the right-hand oscillation device 4R is described. However, the oscillation corresponding to a sound effect may be output to the right-hand oscillation device 4R, and the oscillation corresponding to a vocalization may be output to the left-hand oscillation device 4L.

When oscillation that corresponds to a sound effect and oscillation that corresponds to a vocalization of a person are respectively generated by different oscillation devices, as described above, this enables a viewer to deeply understand the situation in a scene.

FIG. 4 is a diagram of a flow of an example of the method for generating oscillation when the two oscillation devices 4R and 4L are each used to provide oscillation, and illustrates the process of S5 of FIG. 3 in more detail. A step similar to the step described with reference to FIG. 3 is denoted by a step name similar to the step name used in FIG. 3, and a description thereof is omitted. S51 to S54 in FIG. 4 correspond to S5 in FIG. 3.

As illustrated in FIG. 4, after S4, an oscillation signal is generated by the oscillation generator 64 using an analysis result on the basis of a waveform of sound data for each of a sound effect and a vocalization of a person (S51). More specifically, a left-hand oscillation signal that is an oscillation signal that corresponds to sound data that corresponds to a sound effect, and a right-hand oscillation signal that is an oscillation signal that corresponds to sound data that corresponds to a vocalization are generated, the pieces of sound data being separated from each other by analysis.

Next, it is determined by the oscillation generator 64 whether the generated oscillation signal corresponds to a sound effect (S52). When it has been determined that the generated oscillation signal corresponds to a sound effect (Yes), the process moves on to S53, and the left-hand oscillation signal, which is an oscillation signal that corresponds to a sound effect, is output to the left-hand oscillation device 4L. When it has been determined that the generated oscillation signal does not correspond to a sound effect (No), the process moves on to S54, and the right-hand oscillation signal, which is an oscillation signal that corresponds to a vocalization of a person, is output to the right-hand oscillation device 4R.

Accordingly, the left-hand oscillation device 4L is driven on the basis of the input left-hand oscillation signal, and oscillation that corresponds to a sound effect is provided to a user. Likewise, the right-hand oscillation device 4R is driven on the basis of the input right-hand oscillation signal, and oscillation that corresponds to a sound effect is provided to the user.

For example, in the example of the scene 40 illustrated in (A) of FIG. 5, an oscillation signal that corresponds to a vocalization is generated on the basis of a waveform of sound data that corresponds to the vocalization, and an oscillation signal that corresponds to an alarm that corresponds to a sound effect, is generated on the basis of a waveform of sound data that corresponds to the alarm, as illustrated in (B) of FIG. 5. The oscillation device 4R, 4L is driven on the basis of the oscillation signal, and oscillation is provided to a viewer.

Note that, in (B) of FIG. 5, "sound" represents sound data, and "oscillation" represents an oscillation signal. The same applies to (B) of FIG. 6 and (B) of FIG. 7.

Further, in the example of the scene 43 illustrated in (A) of FIG. 6, an oscillation signal that corresponds to a vocalization of a man is generated on the basis of a waveform of sound data that corresponds to the vocalization of the man, and an oscillation signal that corresponds to a vocalization of a woman is generated on the basis of a waveform of sound data that corresponds to the vocalization of the woman, as illustrated in (B) of FIG. 6.

Furthermore, in the example of the scene 45 illustrated in (A) of FIG. 7, an oscillation signal that corresponds to a horn that corresponds to a sound effect, is generated on the basis of a waveform of sound data that corresponds to the horn, as illustrated in (B) of FIG. 7.

When an oscillation signal is generated on the basis of sound data that corresponds to a vocalization to provide oscillation to a viewer, as described above, this enables the viewer to understand, by tactual sense, what is unreadable only using caption information, such as the inflection and the volume of a vocalization, and a speed of the vocalization. Accordingly, the viewer can easily imagine, for example, the personality and feelings of a person, and can more deeply understand the situation. Likewise, in the case of a sound effect, oscillation enables the viewer to understand, for example, the volume, a change in the volume, and the duration time of the sound. Accordingly, the viewer can more deeply understand the situation.

Further, in the generation of oscillation, an oscillation signal may be generated by performing adjustment such that oscillation that corresponds to a sound effect is relatively weaker than oscillation that corresponds to a vocalization of a person. This makes it possible to provide a comfortable viewing, as described above.

Furthermore, when the gender of a person of a vocalization has been determined as a result of analyzing caption information in the generation of oscillation, the oscillation generator 64 may generate an oscillation signal by performing adjustment such that the frequency of oscillation that corresponds to a vocalization of a woman is higher than the frequency of oscillation that corresponds to a vocalization of a man. Accordingly, oscillation is provided to a viewer when the viewer is viewing a scene in which a man and a woman are having a talk, and this enables the viewer to easily intuitively recognize which of a vocalization of a man and a vocalization of a woman the vocalization is.

Moreover, with respect to a scene in which a plurality of persons is having a talk, when vocalization caption data is analyzed to determine that the vocalization caption data is partitioned in order of vocalization in the talk using parentheses or brackets, the oscillation generator 64 may stop oscillation that corresponds to a sound effect in the scene, may limit to determine the oscillation device providing oscillation that corresponds to the first vocalization, and may thereafter alternately oscillate the oscillation device on the left and the oscillation device on the right for every partition.

For example, with respect to a scene in which two people are having a talk, a left-hand oscillation signal and a right-hand oscillation signal are generated, such as outputting, to the right-hand oscillation device 4R, oscillation that corresponds to the first vocalization, and outputting, to the left-hand oscillation device 4L, oscillation that corresponds to the second vocalization.

Further, with respect to a scene in which three or more people are having a talk, a left-hand oscillation signal and a right-hand oscillation signal are generated such that the oscillation devices 4R and 4L are alternately driven, such as outputting, to the right-hand oscillation device 4R, oscillation that corresponds to the first vocalization, outputting, to the left-hand oscillation device 4L, oscillation that corresponds to the second vocalization, and outputting, to the right-hand oscillation device 4R, oscillation that corresponds to the third vocalization.

Consequently, oscillation enables the viewer to understand a pause in the talk and a speed of a vocalization of each person. Accordingly, the viewer can more deeply understand the situation in a scene.

When it has been determined, by caption information being analyzed, that multiple people are having a talk in a scene, as described above, an oscillation signal for a talk mode may be generated, and in other cases, an oscillation signal for a normal mode may be generated. In the talk mode, oscillation that corresponds to a sound effect is stopped, and oscillation signals are alternately output to the oscillation device 4L on the left and the oscillation device 4R on the right for every talk partition. In the normal mode, an oscillation signal that corresponds to a sound effect is output to the left-hand oscillation device and an oscillation signal that corresponds to a vocalization of a person is output to the right-hand oscillation device.

Note that the example in which there are two oscillation devices has been described above. However, the number of oscillation devices may be one, and a single oscillation device may be configured such that the single oscillation device can oscillate on the basis of an oscillation signal that corresponds to a vocalization and can oscillate on the basis of an oscillation signal that corresponds to a sound effect.

In this case, one of oscillation that corresponds to a vocalization and oscillation that corresponds to a sound effect may be stopped if the oscillation corresponding to a vocalization and the oscillation corresponding to a sound effect occur at the same time. Which of the oscillation corresponding to a vocalization and the oscillation corresponding to a sound effect is to be stopped can be determined using, for example, content meta-information.

For example, when the content meta-information indicates action as the type of video, oscillation that corresponds to a vocalization of a person is stopped, and an oscillation signal that corresponds to a sound effect is output. This results in providing dynamic oscillation depending on the action scene, and in more deeply understanding the situation.

Embodiments of the present technology are not limited to the embodiments described above, and various modifications may be made thereto without departing from the scope of the present technology.

In the embodiments described above, a cellular phone that includes a display section and an oscillation device in addition to a controller, has been described as an example of the information processing apparatus. However, the information processing apparatus is not limited thereto. It is sufficient if the information processing apparatus includes at least a controller and a communication section used to establish a connection with an external apparatus.

For example, the oscillation providing system described above may be applied to a movie theater; and a screen that serves as a display section, and a chair or eyewear or a vest or the like that includes an oscillation device may be used as an external apparatus, where the eyewear or the vest or the like can be directly worn by a viewer. Then, the information processing apparatus may be capable of communicating with the external apparatus. It is sufficient if the chair, the eyewear, the vest, or the like includes at least one oscillation device, where the at least one oscillation device can provide oscillation as in the case of the oscillation devices in the embodiments described above.

Further, a hearing aid may include an oscillation device, and may be used as an external apparatus that is capable of communicating with the information processing apparatus including a controller. This makes it possible to alert a user of the hearing aid to sound by providing oscillation if, for example, there is a decrease in hearing of the user.

Further, the example in which a video file is assumed to be, for example, a movie or a drama has been described in the embodiments above. However, the present technology can be applied to, for example, a video file of a game. For example, a video file of a role-playing game (RPG) or a simulation game includes caption information and sound information. Thus, an oscillation signal may be generated using the caption information and the sound information.

Furthermore, when a video file, such as virtual reality (VR) content, that includes sound position information is played back, the sound position information may be further used to determine, for example, which oscillation device from among a plurality of oscillation devices is to be driven using which oscillation signal.

Further, the example in which two oscillation devices or a single oscillation device is used has been described in the embodiments above. However, three or more oscillation devices may be used.

Furthermore, the example of generating oscillation primarily using caption information and sound information has been described in the embodiments above. However, an oscillation signal may be generated using content meta-information, video information, and viewer information in addition to using the caption information and the sound information. This makes it possible to provide oscillation suitable for assistance in understanding the details of a scene.

Oscillation according to the feature of image content can be provided by generating an oscillation signal in consideration of content meta-information. For example, when a video file of which the type of video is action is played back, oscillation can be generated only for a sound effect without being generated for a vocalization of a person, as described above.

Further, the details of a scene can be more deeply understood by generating an oscillation signal in consideration of video information. For example, in the scene 40 illustrated in (A) of FIG. 5, a person who is burying his head in his hands is detected using video information, and the person is recognized as being sad. As a result of the recognition, an oscillation signal may be generated such that oscillation that corresponds to a vocalization of the person is weaker than an oscillation signal according to basic settings. Accordingly, oscillation makes it possible to more deeply understand that the person is sad.

Furthermore, a more favorable oscillation for a viewer can be provided by generating an oscillation signal in consideration of viewer information. As described above, the viewer information includes attribute information regarding an attribute of a viewer who is a user, and viewing-environment information. Examples of the attribute information regarding an attribute of a viewer include a hearing loss state, an age, and an oscillation preference of a viewer.

Depending on the hearing loss state of a viewer, the magnitude of oscillation can be adjusted such as making oscillation stronger in the case of a total inability to hear than in the case of a partial inability to hear.

Further, elderly people generally experience a decrease in hearing and a decrease in the ability to feel oscillation due to aging. Thus, using age information, the magnitude of oscillation can be adjusted such as making oscillation stronger when a viewer is an elderly person.

Further, there is an individual difference in the preference regarding the magnitude of oscillation. Thus, a more favorable oscillation can be provided by a viewer setting his/her oscillation preference.

Furthermore, with respect to viewer-environment information, an outdoor environment is generally noisier than an indoor environment. Thus, oscillation that is suitable for a viewing environment can be provided to a viewer by, for example, performing adjustment to make oscillation stronger in the outdoor environment than in the indoor environment.

The magnitude of oscillation may be adjusted by performing a comprehensive determination on the basis of the viewer information.

Further, the provision of an oscillation sensation has been described in the embodiments above as an example of the provision of a skin sensation. However, a temperature sensation such as warm and cold, or a pressure sensation such as a feeling of pressure may be provided to a user as the skin sensation. In this case, a device for providing a sense of, for example, warmth, coolness, or pressure is used.

For example, when the skin sensation is provided using video information in addition to using caption information and sound information, and when it has been determined, by the caption information and the sound information being analyzed, that a word such as blaze, fire, or flame is included, and it has been further determined, by the video information being analyzed, that an image is red due to flame, a warm sensation of temperature can be provided to a user using a device for providing a sense of warmth.

Further, a feeling of wind or a feeling of water may be provided to a user by providing wind or water to the user by use of, for example, an air-blowing device, or a device that can discharge water. This is an example of the provision of the skin sensation.

Furthermore, two or more senses from among an oscillation sensation, a temperature sensation, a pressure sensation, a feeling of wind, a feeling of water, and the like may be combined such that a plurality of senses can be provided.

Note that the present technology may also take the following configurations.

(1) An information processing apparatus, including
    a controller that generates at least one of an oscillation signal corresponding to sound-effect caption data or an oscillation signal corresponding to vocalization caption data on the basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption information, the sound data being included in the sound information.

(2) The information processing apparatus according to (1), in which
the controller divides the sound data into sound data corresponding to the sound-effect caption data and sound data corresponding to the vocalization caption data, and
the controller generates the oscillation signal corresponding to the sound-effect caption data on the basis of a waveform of the sound data corresponding to the sound-effect caption data, and generates the oscillation signal corresponding to the vocalization caption data on the basis of a waveform of the sound data corresponding to the vocalization caption data.

(3) The information processing apparatus according to (2), in which
the controller determines whether the caption data is the sound-effect caption data or the vocalization caption data using at least one of display position information, mark information, font information, or color information that is included in the caption information, the display position information being information regarding a position at which a caption is displayed on an image, the mark information being information regarding a mark displayed on the image, the font information being information regarding a font of a word in the caption, the color information being information regarding a color of the word in the caption.

(4) The information processing apparatus according to (1) or (2), in which
when the caption information includes caption information corresponding to a scene in which a plurality of persons is having a talk, the controller partitions, using the caption information and in order of vocalization in the talk, the vocalization caption data in the scene in which the plurality of persons is having the talk, and generates the oscillation signal corresponding to each piece of vocalization caption data obtained by the partition.

(5) The information processing apparatus according to (3), in which
the controller generates the oscillation signal corresponding to the sound effect and the oscillation signal corresponding to the vocalization of the person such that there is a relative difference in magnitude between oscillation based on the oscillation signal corresponding to the sound effect and oscillation based on the oscillation signal corresponding to the vocalization of the person.

(6) The information processing apparatus according to any one of (1) to (4), in which
the video file includes content meta-information, and
the controller generates the oscillation signal in consideration of the content meta-information.

(7) The information processing apparatus according to any one of (1) to (6), in which
the controller generates the oscillation signal in consideration of information regarding the user.

(8) The information processing apparatus according to any one of (1) to (7), further including
an oscillation providing section that provides oscillation to the user on the basis of the oscillation signal.

(9) The information processing apparatus according to (8), including
a plurality of the oscillation providing sections.

(10) The information processing apparatus according to (9), in which
the controller generates the oscillation signal corresponding to the sound-effect caption data and the oscillation signal corresponding to the vocalization caption data using the result of analyzing the caption information and the sound information, and outputs the generated oscillation signals to the different oscillation providing sections of the plurality of the oscillation providing sections.

(11) An information processing method, including
generating at least one of an oscillation signal corresponding to sound-effect caption data or an oscillation signal corresponding to vocalization caption data on the basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption information, the sound data being included in the sound information.

(12) A program that causes an information processing apparatus to perform a process including:
analyzing caption information and sound information that are included in a video file, the caption information including caption data that includes sound-effect caption data and vocalization caption data, the sound information including sound data, the sound-effect caption data being used to represent a sound effect in the form of text information, the vocalization caption data being used to represent a vocalization of a person in the form of text information; and
generating at least one of an oscillation signal corresponding to the sound-effect caption data or an oscillation signal corresponding to the vocalization caption data on the basis of a waveform of the sound data using a result of the analysis.

REFERENCE SIGNS LIST

1 information processing apparatus
6 controller
42, 44, 52, 55 vocalization caption data
41, 46, 48, 51, 54, 56 sound-effect caption data

The invention claimed is:
1. An information processing apparatus, comprising:
a controller configured to generate at least one of an oscillation signal corresponding to sound-effect caption data or an oscillation signal corresponding to vocalization caption data on a basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption information, the sound data being included in the sound information, wherein the controller divides the sound data into sound data corresponding to the sound-effect caption data and sound data corresponding to the vocalization caption data, wherein the controller generates the oscillation signal corresponding to the sound-effect caption data on a basis of a waveform of the sound data corresponding to the sound-effect caption data, wherein the controller generates the oscillation signal corresponding to the vocalization caption data on a basis of a waveform of the sound data corresponding to the vocalization caption data, and wherein the controller is implemented via at least one processor.

2. The information processing apparatus according to claim 1, wherein the controller determines whether the caption data is the sound-effect caption data or the vocalization caption data using at least one of display position information, mark information, font information, or color information that is included in the caption information, the display position information being information regarding a position at which a caption is displayed on an image, the mark information being information regarding a mark displayed on the image, the font information being information regarding a font of a word in the caption, the color information being information regarding a color of the word in the caption.

3. The information processing apparatus according to claim 2, wherein when the caption information includes caption information corresponding to a scene in which a plurality of persons is having a talk, the controller partitions, using the caption information and in order of vocalization in the talk, the vocalization caption data in the scene in which the plurality of persons is having the talk, and generates the oscillation signal corresponding to each piece of vocalization caption data obtained by the partition.

4. The information processing apparatus according to claim 2, wherein the controller generates the oscillation signal corresponding to the sound effect and the oscillation signal corresponding to the vocalization of the person such that there is a relative difference in magnitude between oscillation based on the oscillation signal corresponding to the sound effect and oscillation based on the oscillation signal corresponding to the vocalization of the person.

5. The information processing apparatus according to claim 2, wherein the video file includes content meta-information, and
the controller generates the oscillation signal in consideration of the content meta-information.

6. The information processing apparatus according to claim 2, wherein the controller generates the oscillation signal in consideration of information regarding the user.

7. The information processing apparatus according to claim 2, further comprising:

an oscillation providing section configured to provide oscillation to the user on a basis of the oscillation signal,
wherein the oscillation providing section is implemented via at least one processor.

8. The information processing apparatus according to claim 7, further comprising:

a plurality of oscillation providing sections.

9. The information processing apparatus according to claim 8, wherein the controller generates the oscillation signal corresponding to the sound-effect caption data and the oscillation signal corresponding to the vocalization caption data using the result of analyzing the caption information and the sound information, and outputs the generated oscillation signals to the different oscillation providing sections of the plurality of the oscillation providing sections.

10. An information processing method, comprising:

generating at least one of an oscillation signal corresponding to sound-effect caption data or an oscillation signal corresponding to vocalization caption data on a basis of a waveform of sound data using a result of analyzing caption information and sound information that are included in a video file, the sound-effect caption data being used to represent a sound effect in the form of text information, the vocalization caption data being used to represent a vocalization of a person in the form of text information, the sound-effect caption data and the vocalization caption data being included in caption data that is included in the caption information, the sound data being included in the sound information, wherein the sound data is divided into sound data corresponding to the sound-effect caption data and sound data corresponding to the vocalization caption data, wherein the oscillation signal corresponding to the sound-effect caption data is generated on a basis of a waveform of the sound data corresponding to the sound-effect caption data, and wherein the oscillation signal corresponding to the vocalization caption data is generated on a basis of a waveform of the sound data corresponding to the vocalization caption data.

11. A non-transitory computer-readable storage medium having embodied thereon a program, which when executed by an information processing apparatus causes the information processing apparatus to perform a process, the process comprising:

analyzing caption information and sound information that are included in a video file, the caption information including caption data that includes sound-effect caption data and vocalization caption data, the sound information including sound data, the sound-effect caption data being used to represent a sound effect in the form of text information, the vocalization caption data being used to represent a vocalization of a person in the form of text information; and generating at least one of an oscillation signal corresponding to the sound-effect caption data or an oscillation signal corresponding to the vocalization caption data on a basis of a waveform of the sound data using a result of the analysis, wherein the sound data is divided into sound data corresponding to the sound-effect caption data and sound data corresponding to the vocalization caption data, wherein the oscillation signal corresponding to the sound-effect caption data is generated on a basis of a waveform of the sound data corresponding to the sound-effect caption data, and wherein the oscillation signal corresponding to the vocalization caption data is generated on a basis of a waveform of the sound data corresponding to the vocalization caption data.

* * * * *